Sept. 6, 1938.  R. W. LUCE  2,129,017
REFLECTING UNIT
Filed Dec. 18, 1934  4 Sheets-Sheet 1

INVENTOR
RICHARD W. LUCE
BY Victor D. Borst
ATTORNEY

Sept. 6, 1938.  R. W. LUCE  2,129,017
REFLECTING UNIT
Filed Dec. 18, 1934  4 Sheets-Sheet 2

INVENTOR
RICHARD W. LUCE
BY
Victor D. Borst
ATTORNEY

Sept. 6, 1938.   R. W. LUCE   2,129,017
REFLECTING UNIT
Filed Dec. 18, 1934   4 Sheets-Sheet 3
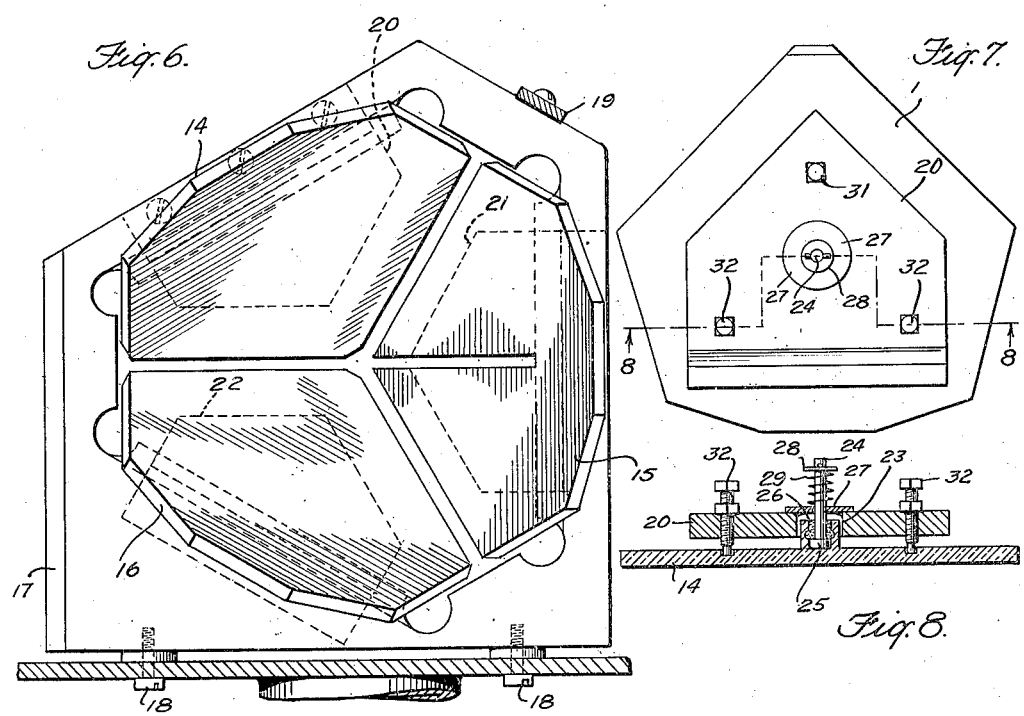
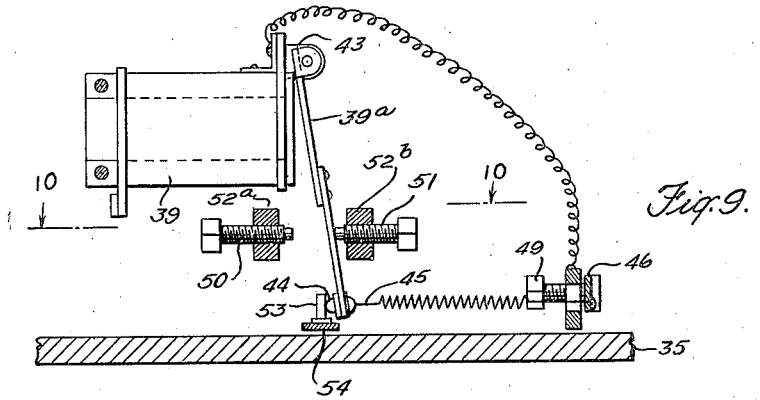
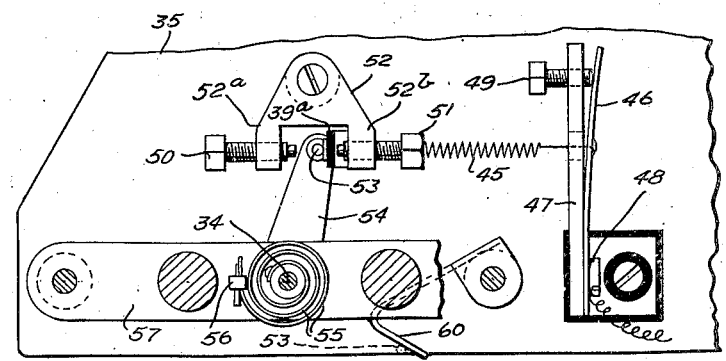
INVENTOR
RICHARD W. LUCE
BY
ATTORNEY

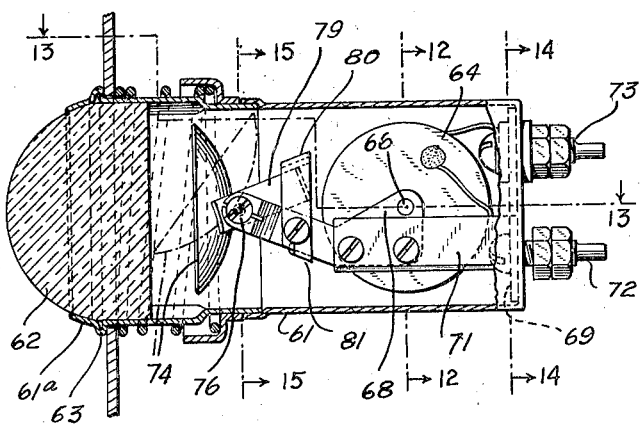

Patented Sept. 6, 1938

2,129,017

UNITED STATES PATENT OFFICE 2,129,017

REFLECTING UNIT

Richard W. Luce, Westfield, N. J., assignor to Signal Service Corporation, a corporation of Delaware Application December 18, 1934, Serial No. 758,026

3 Claims. (Cl. 177—329)

The invention herein disclosed relates to a light-reflecting, autocollimating unit that is cable of being rendered periodically ineffective.

Light-reflecting, autocollimating units reflect light falling thereon back in the general direction of the incident rays. Because of this characteristic, these units are commonly used in signs, particularly road-side, warning signs wherein they appear, when the light emanating from the headlights of an approaching automobile falls thereon, as primary sources of light and give the sign the effect of being made up of light-emitting units. Signs are thus rendered luminous at those times when luminosity is desired without the necessity of providing the energy which is required for a primary source of light. Heretofore, however it has not been possible to obtain the advantages of the light-reflecting, autocollimating units and at the same time secure the advantages inherent in an intermittently operative light source such as is used in the flashing-road side warning signs and animated signs, and it is an object of this invention to provide a light-reflecting, autocollimating unit which may be rendered periodically ineffective for such purposes.

In accordance with the invention, a light-reflecting, autocollimating unit is provided with the elements necessary for returning light falling thereon back in the general direction of the incident rays and in addition elements that are operative to render the reflecting unit ineffective and the operation of which may be controlled to produce any desired effect. Two specific embodiments are illustrated in the drawings, one in which a light screen is movable into and out of a position in which the reflecting unit is rendered ineffective, and the other in which an active element of the reflecting unit, specifically the reflector, is movably mounted for movement between an effective position, in which it cooperates in reflecting light falling thereon back in the general direction of the incident rays, and an ineffective position in which the unit is rendered ineffective for reflecting light falling thereon.

The first mentioned embodiment is illustrated in Figs. 1 to 10 and the second in Figs. 11 to 16 of the drawings in which:

Fig. 6 is a fragmentary, sectional, front elevation taken along the line 6—6 of Fig. 4;

Fig. 7 is an enlarged detail illustrating the mounting of the reflecting-units;

Fig. 8 is a sectional elevation of the same taken along the irregular line 8—8 of Fig. 7;

Fig. 9 is a side elevation of the electromagnetic unit for operating the light screen;

Fig. 10 is a fragmentary plan taken along the line 10—10 of Fig. 9;

Fig. 11 is a longitudinal, sectional elevation of a catadioptric reflecting unit;

Fig. 12 is a transverse section of the same taken along the line 12—12 of Fig. 11;

Fig. 13 is a longitudinal, sectional plan of the same taken along the line 13—13 of Fig. 11;

Fig. 14 is a transverse section of the same taken along the line 14—14 of Fig. 11; and Fig. 15 is a similar section taken along the line 15—15 of Fig. 11.

Figure 1:
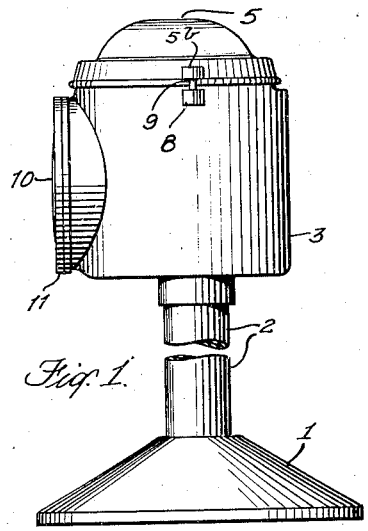
Fig. 1 is a side elevation of a blinking, light-reflecting, autocollimating unit suitable for a road-side, warning sign.
Figure 2:
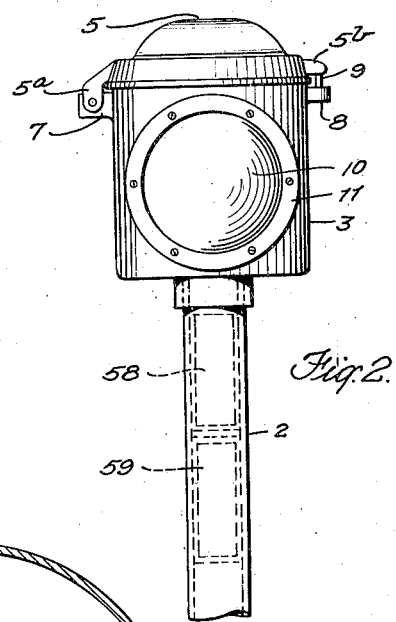
Fig. 2 is a front elevation of a part thereof.
Figure 3:
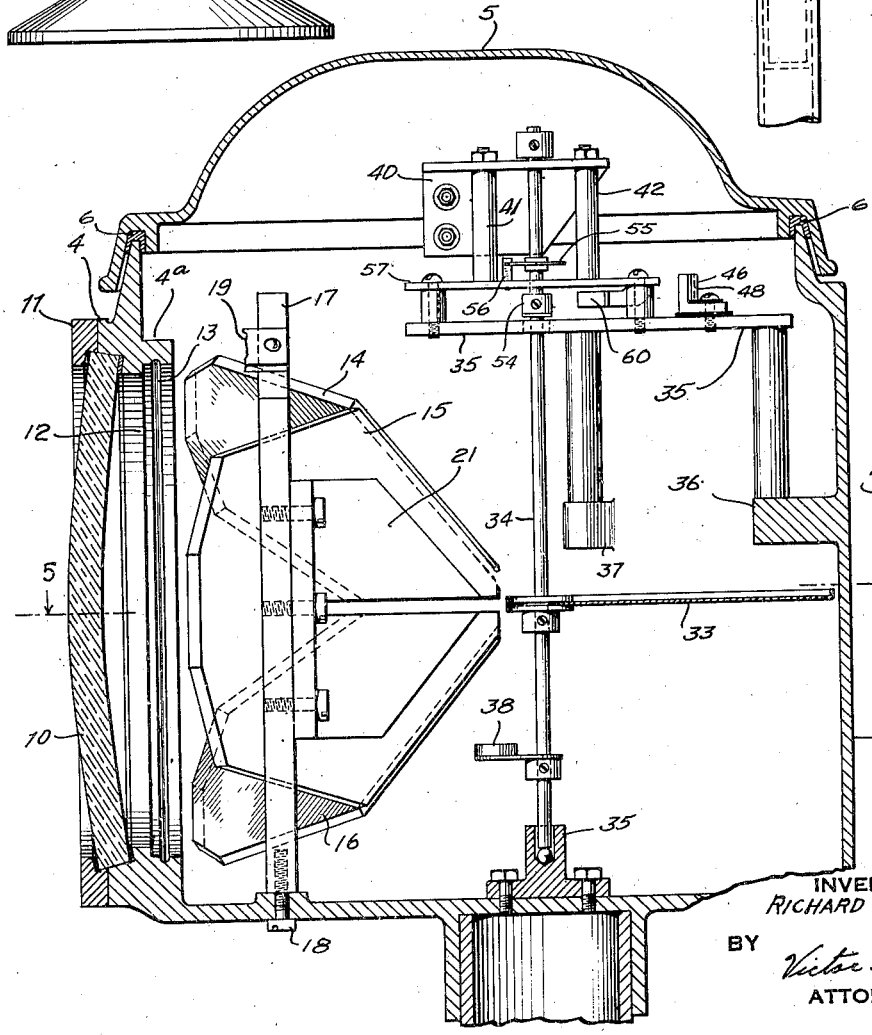
Fig. 3 is an enlarged, sectional elevation of the light-reflecting unit thereof.
Figure 4:
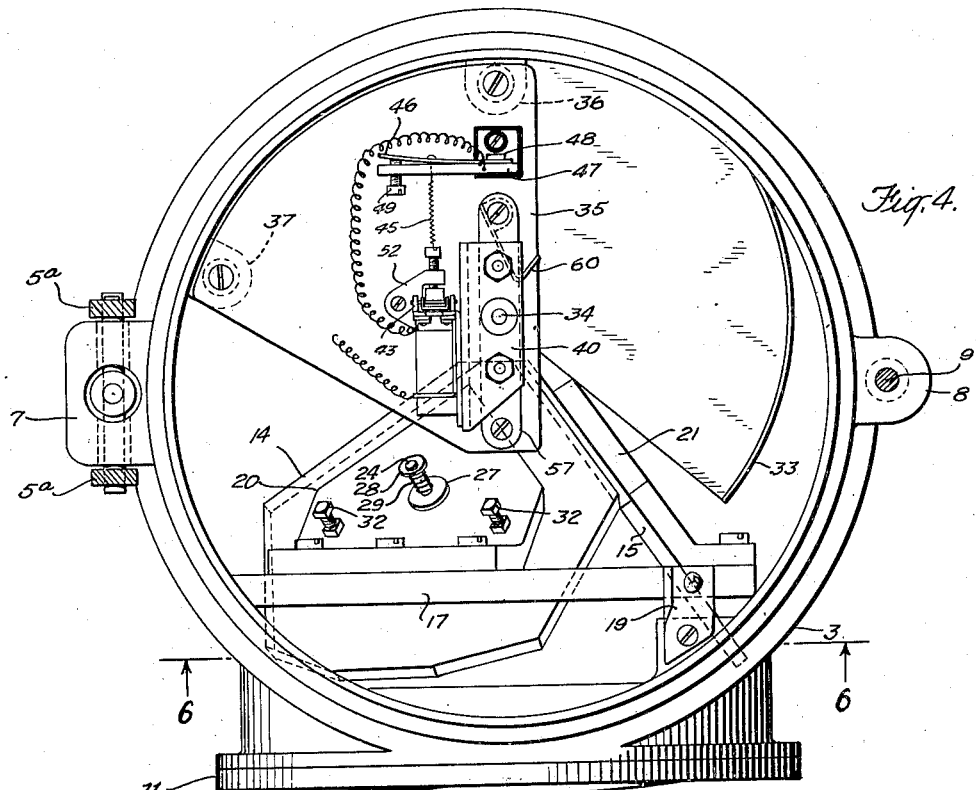
Fig. 4 is a plan with the cover of the casing removed.
Figure 5:
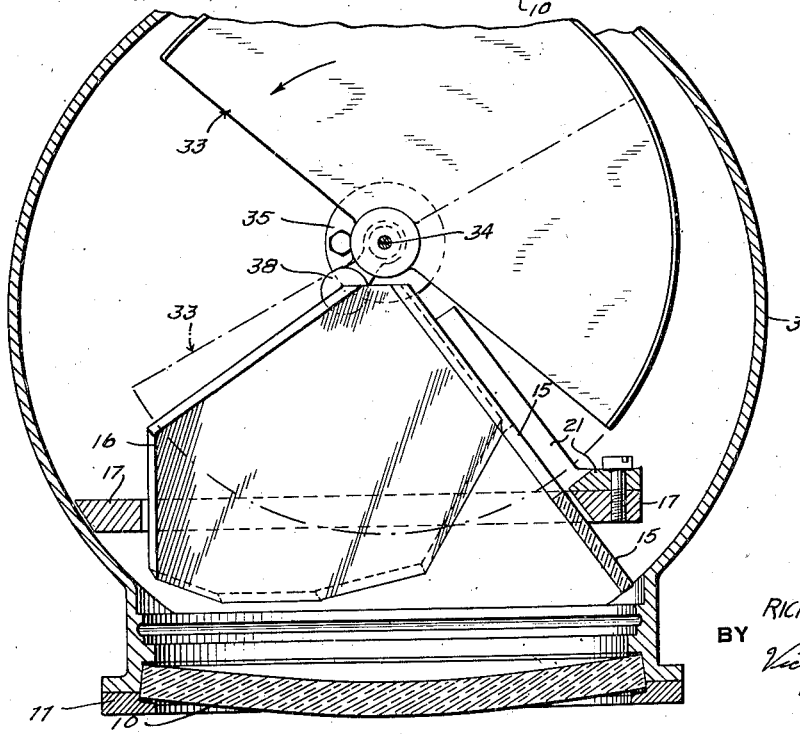
Fig. 5 is a sectional plan taken on the line 5—5 of Fig. 3.

The road-side warning sign as illustrated in Figs. 1 to 10 includes a base 1 from which a hollow standard 2 extends and a reflecting unit 3 mounted upon the top of the standard. The reflecting unit is provided with a circular casing open at the top and having a circular aperture in the side thereof defined by a boss 4. Normally the casing is closed by a cover 5 which is provided with a gasket 6 by means of which the interior of the reflecting-unit may be sealed. The cover is provided with a bifurcated bracket 5a which is pivoted to a bracket 7 extending from the case of the reflecting unit. Diametrically opposite to the bracket 7, there is on the casing a bracket 8 having a vertical opening therethrough. The opening through the bracket 8 receives a bolt 9 that is pivotally secured to a bracket 5b extending from the cover. The cover is firmly secured in place by a nut threaded on to the bolt 9 and engaging the bracket 8. The top of the case is thus closed and sealed as it is common to fill the case of the reflector-unit with an inert gas and thus exclude the moisture and dust-laden atmosphere.

The aperture through the side of the case is closed by a protective lens 10 which is secured to the end of the boss 4 by a ring frame 11. The lens 10 has no lenticular function but is merely provided for the purpose of sealing the aperture through the side of the case and protecting the elements of the reflecting-unit. The lens 10 is, however, slightly curved to prevent specular reflection. At the opposite end of the boss, there is a light-distributing lens 12 which is secured against a shoulder in the bushing by a spring ring 13 fitting into a complementary groove.

Behind the opening through the side of the case, there is mounted a reflector of the type commonly known as a triple reflector and consisting of three flat reflectors 14, 15 and 16, the three reflecting surfaces converging in the manner of the three adjacent sides of a cube. Each of these reflectors is made of a piece of plate glass properly silvered. The reflectors are mounted within the unit on a frame 17 which is an irregular polygon in shape. The frame 17 is secured to the bottom of the case by a bolt 18 and to a flange 4a, on the boss, by a strap 19.

The reflectors are secured to this frame, the plane of which is parallel to the plane of the aperture, through plates 20, 21 and 22. Each plate has a flange a extending at an angle thereto and secured to the frame 17. The plates thus extend at an angle to the plane of the frame. The manner in which each reflector is secured to its particular supporting plate is illustrated in Figs. 7 and 8 wherein the details of the mounting of the reflector 15 are disclosed. The reflector 15 is, as heretofore stated, a piece of plate glass which has molded thereon at approximately the center thereof a hollow boss 23. Into this boss there is fitted a pin 24 having an enlarged head 25 which abuts against the bottom of the boss. The pin is secured in the boss 23 by pitch 26 and extends from the reflector, perpendicular thereto. In the center of the plate, there is an opening which is substantially larger in diameter than the boss 23. Through this opening the pin, and into the opening, the boss 23 extend. A washer 27 surrounds the pin and rests upon or abuts against the surface of the plate. A smaller washer 28 is secured on the pin 24 adjacent the outer or free end thereof. A spring 29 acts between the washer 27 and the washer 28 and tends to urge the reflector against the plate. Three set screws 30, 31 and 32 are provided with reduced ends that are received in depressions in the surface of the reflector. These set screws extend through and are threaded in openings in the plate and are successively spaced about the opening through the plate through which the pin 24 extends through angles of 120°. These adjusting screws, together with the loose fit of the pin, provide an adjustment similar to that used for levelling plates. This adjustment is provided for the purpose of properly adjusting the three reflectors with respect to each other so that any light falling on the unit or passing through the aperture is returned in the general direction of the incident rays. It is only necessary that two of the reflector plates be adjustable, for if two of the reflector plates are properly adjusted with respect to the third, the three must be in proper adjustment.

It is to be noted that there is a slot between the adjacent sides of the reflectors 14 and 16 and a slot cut into the reflector 15 which forms a continuation of the slot formed by the separation of the adjacent edges of the reflectors 14 and 16. This slot is provided so that a light screen or shutter, in the form of an opaque metal disk 33 that may be painted black to absorb light, may be moved through the reflectors. The disk 33 is mounted on a shaft 34, the axis of which is parallel to the plane of the frame 17.

The lower end of the shaft is rotatably mounted in a thrust bearing 35 secured to the bottom of the case and the upper end of the shaft is rotatably mounted in a bracket 35 mounted on lugs 36 and 37 extending from the inner surface of the case of the unit. The disk 33 is mounted on the shaft so that upon rotation of the shaft the disk enters the slots in the reflector and interrupts the normal passage of light. The disk has a sector of approximately 180° cut therefrom, and a counterbalance 38 is secured on the shaft to provide the weight which has been removed by cutting the sector from the disk. The disk on entering the slot in the reflector interrupts the incident light after the initial reflection within the reflector and thus prevents a return of the light to the light source. To completely darken the unit the disk must interrupt all of the incident light.

The shaft 34 is oscillated by an electromagnet 39 which is mounted on a plate 40 that is supported on pins 41 and 42 extending from the bracket 35. The electromagnet is provided with an armature 39a which is pivotally secured to a bifurcated bracket 43 on the magnet. The free end of the armature 39a is provided with an electrical contact element 44 on one side and the opposite side is secured to one end of a spring 45. The opposite end of the spring 45 is secured to a leaf spring 46 secured, at one end, to a plate 47 by a bolt 48. The opposite end of the leaf spring abuts against an adjusting screw 49 which extends through and is threaded in the plate 47. The leaf spring and adjusting screw provide a means by which the tension on the spring 45 may be adjusted. The armature 39a acts between two limit stops. These limit stops are adjustable machine screws 50 and 51 which extend through and are threaded in the arms 52a and 52b of a bifurcated bracket 52 that is secured to the bracket 35. The armature lies in the path of a pin 53 that extends from a radial arm 54 mounted upon the shaft 34 adjacent its upper end. When the pin 53 is in contact with the contact 44 of the armature of the electromagnet, the disk is so positioned that it is out of the reflectors, that is, the cut-out sector lies adjacent the reflectors so that the reflecting unit is effective. A hair spring 55 secured at one end to the shaft 34 and at the other end to a lug 56, extending from a plate 57 mounted on the bracket 35, biases the reflector to the position in which the pin 53 is in contact with the armature of the electromagnet. In other words, this hair spring provides a force which, upon cessation of the operation of the electromagnet, returns the disk or light screen to the inoperative position or the position in which the reflecting unit is effective.

The electromagnet is supplied with current from two dry cells 58 and 59 which are mounted in the hollow standard 2. These batteries are connected to the electromagnet through the contact 44 on the armature thereof and the pin 53. When the pin 53 engages the contact 44, the circuit from the batteries to the electromagnet is closed. The armature of the electromagnet is then drawn to or towards the magnet and in effect kicks the pin, thus causing the shaft 34 to rotate. When the shaft rotates through an angle of approximately 270°, the arm 54 strikes against a leaf spring 60 which is secured on the bracket 35. The leaf spring, by the force of contact with the arm 54 absorbs the energy of the moving shaft and releases that energy to return the shaft. Upon returning, the pin 53 again engages the contact 44 and the shaft is again actuated by the electromagnet. The shaft is thus oscillated about its axis and the disk or light screen 33 is caused to intermittently or periodically move into and out of the reflectors. The size of the disk, and the extent of its movement, is such that the reflecting-unit is completely cut off and completely opened up; the speed of movement of the disk is such as to produce the best optical effect. The disk screens the reflected light and consequently while it enters from one side, it appears to be entering from both sides and towards the middle. The arrangement thus provides an intermittent or blinking autocollimating unit which in the event of current failure, that is, failure of the batteries, the light screen is moved to a position in which the reflecting unit is effective.

This arrangement provides an effective intermittent warning signal which does not require any energy for its illumination. The only energy required is the two batteries for operating the light screen. This constitutes a material economy in energy and in servicing.

The unit illustrated in Figs. 11 to 15 inclusive is of the type, known as a reflecting button, that is commonly used in outlining characters that make up a sign. The unit includes a case 61 in which all of the active parts of the unit are mounted. The case 61 is cup-shaped and a lens 62 is mounted in the open end thereof, the end of the case being beaded over at 61a and embracing the lens. There is also formed in the case at the end of the bead 61a a flange 63. Mounted adjacent the opposite end of the case there is an electromagnet 64. The electromagnet includes a coil 65 and a core. The core consists of three parts, one part 66 extending through the center of the coil and transversely of the case and two arms 67 and 68 each connected to one end of the central part 66 and extending longitudinally of the case. The arms 67 and 68 are identical in shape, each being formed in the shape of an angle as clearly illustrated in Fig. 11. Adjacent their free ends the arms 66 and 67 are offset transversely of the unit and in the offset end portions there are provided internally threaded openings and the end portions are split for a purpose which will hereinafter appear.

The electromagnet is secured in the unit through a plate 69 which is secured to the end of the casing. The plate is a brass stamping and includes a pair of spaced tongues or arms 70 and 71. To these arms 70 and 71 the core arms 67 and 68 are secured by machine screws. The plate 69 is secured to the end of the case by bolts 72 and 73 which also act as electrical connectors for the electromagnet. The plate 69 thus supports the electromagnet in spaced relation with respect to the walls of the case. One of the bolts, 73, is insulated from the case by an insulated washer through which it extends. The other bolt 72 is not so insulated. One end of the electromagnet is connected to the bolt 73 and the other end is connected directly to the case.

A reflector 74 is mounted between the arms 67 and 68 of the electromagnet. In the opening in the offset portion of each of these arms there is a machine screw 75 and 76 respectively. The ends of the machine screws have centering depressions and these machine screws form bearings for a shaft 78 through which the reflector 74 is pivotally mounted between the arms of the electromagnet. The shaft 78 extends through a bracket 79 secured to the reflector. The bracket is channel-shaped in plan and the flange portions thereof are bent to conform to the rear surface of the reflector which is spherical in shape and are secured thereto. The shaft 78 passes through the arms of this bracket and is secured therein against rotational movement relative thereto. The ends of the shaft 78 are tapered and are received in the centering depressions in the machine screws 75 and 76. This construction forms an adjustable construction and a bearing for the shaft 78 which has a minimum of friction. The split ends of the arms may be compressed on the machine screws in order to set the screws in their adjusted positions.

As constructed, the line about which the reflector pivots is so related to the center of gravity of the reflector and the bracket 79 that the reflector tends to move to a position such as that illustrated in the drawings, that is, the position in which the unit is effective. In other words, as the unit is illustrated in the drawings, the reflector is so positioned that light incident upon the unit will be returned in the general direction of the incident rays. To position the reflector properly, in so far as its pivotal action is concerned, there are provided limit stops 80 and 81 which engage the web portion of the bracket 79 when the reflector is properly positioned behind the lens unit. These limit stops each consist of a strip of sheet metal which is secured to and extends transversely from each arm 67 and 68 of the core of the electromagnet. The ends of these strips of metal are bent at right angles to form flanges against which the web portion of the bracket 79 abuts. When there is no current passing through the electromagnet, the web portion of the bracket 79 of the reflector unit abuts against the limit stops. The core of the electromagnet and the bracket 79 are made of metal which is a good conductor of electromagnetic lines of force. When the electromagnet is energized, the bracket 79 is acted upon by the magnetic lines of force passing through the core of the electromagnet and moves the bracket into a position in alignment with the arms 67 and 68 of the electromagnet, in which position the reflecting unit is ineffective because the reflector is not positioned to cooperate with the lens unit to return light incident thereon back in the general direction of the incident rays. When the electromagnet is deenergized, the reflector by virtue of the forces of gravity acting thereon, again assumes the position illustrated in the drawings.

It will be apparent from the above description of the unit illustrated in Figs. 11 to 15 that the unit is susceptible for use in animated signs. When used in such a sign, the electromagnets of the several units making up the sign are energized and deenergized by a circuit controller such as those that are commonly used for animated signs in which the illumination is obtained from a primary source. The only difference is that while the circuit controller in the ordinary animated sign opens and closes the circuit to the primary sources of illumination, the circuit controller in this instance will open and close the circuit to the electromagnet and thus control, in proper sequence and cyclic operation, the effectiveness of the several units making up the animated sign. The amount of energy necessary is very slight as the amount of work to be done by the electromagnet is negligible. The effects of a luminous animated sign are thus obtained without the energy necessary for a primary source of illumination.

In certain of the units making up an animated sign, it may be desirable to have some units normally ineffective so that in the event of current failure there will be but one set of the units effective and a proper sign will be displayed. For example, where an animated sign consists in giving the effect of the legs of an animal, the sign is commonly made up of several pairs of legs and the units making up the several pairs are operated in cyclic operation so that they appear to move. In the event that current fails, it is desirable that only two pair of legs are illuminated. In order to provide for this contingency the unit illustrated in Figs. 11 to 15 is so constructed that if during assembly of the unit the reflector is mounted upside down, as illustrated in Fig. 11, the unit will be normally ineffective. It is for this purpose that the bracket 79 extends at an angle to the plane of the reflector unit. When mounted in this reverse relation, the weight of the reflector and bracket is such and so related to its pivotal axis that the reflector tends to move to a position in which the bracket abuts against the limit stops. When so positioned, the reflector is tilted out of the plane in which it cooperates with the lens member to return light falling thereon back in the general direction of the incident rays. However, when the electromagnet is energized, the reflector is brought into an active position and light falling thereon is returned or reflected back. It will thus be observed that all of the parts of the reflector units may be constructed alike and in assembling the reflecting units some may be made normally effective and others normally ineffective. Those which are normally ineffective will of course be ineffective in the event of a current failure.

It will be obvious that various changes may be made by those skilled in the art in the details of the embodiments illustrated in the drawings and described above within the principle and scope of the invention as expressed in the appended claims.

I claim:

1. A light-reflecting autocollimating unit comprising a triple reflector for reflecting light falling thereon back in the general direction of the incident rays, the reflector having a slot therethrough, a movably mounted opaque light screen for interrupting the rays of light positioned to enter the slot in the reflector and interrupt the light rays therein and means for moving the light screen into and out of light-interrupting position within the reflector.

2. A light-reflecting autocollimating unit comprising a triple reflector for reflecting light falling thereon back in the general direction of the incident rays, the reflector having a slot therethrough, a movably mounted opaque light screen for interrupting the rays of light positioned to enter the slot in the reflector and interrupt the light rays therein, means for moving the light screen into and out of light-interrupting position within the reflector, and means biasing the light screen to the non-light-interrupting position.

3. A light-reflecting, autocollimating unit comprising a triple reflector for reflecting light falling thereon back in the general direction of the incident rays, the reflector having a slot therethrough, a rotatably mounted opaque light screen for interrupting the rays of light positioned to enter the slot in the reflector and interrupt the light rays therein, means for rotating the light screen into and out of light-interrupting position, and means biasing the reflector to non-light-interrupting position.

RICHARD W. LUCE.